United States Patent [19]
Molino

[11] 3,724,255
[45] Apr. 3, 1973

[54] DUCT FORMING APPARATUS
[76] Inventor: Angelo R. Molino, 816 East Building, Haddonview Apartments, Haddonfield, N.J.
[22] Filed: Apr. 29, 1971
[21] Appl. No.: 138,444

[52] U.S. Cl. ..................72/306, 72/319, 72/472, 113/1 R
[51] Int. Cl. ...........................B21d 11/04
[58] Field of Search........72/306, 308, 309, 319, 320, 72/321, 403, 470, 471, 472, 478; 113/1 R, 116 R, 116 F, 116 DD, 116 Y, 120 R, 120 G, 120 E, 120 AA

[56] References Cited
UNITED STATES PATENTS

| | | | |
|---|---|---|---|
| 3,621,699 | 11/1971 | Valek et al. | 113/120 E |
| 3,010,506 | 11/1961 | Bellatorre | 72/22 |
| 3,174,322 | 3/1965 | Cookson | 72/403 |
| 3,543,558 | 12/1970 | Currier | 72/308 |
| 1,915,102 | 6/1933 | Rehbein | 72/403 |
| 2,552,617 | 5/1951 | Bath | 72/403 |
| 3,490,137 | 1/1970 | Buck et al. | 113/1 R |
| 2,699,134 | 1/1955 | Maxwell | 113/116 R |

*Primary Examiner*—Charles W. Lanham
*Assistant Examiner*—M. J. Keenan
*Attorney*—Jacob Trachtman

[57] ABSTRACT

An apparatus for forming the end of a duct member includes a lip forming section and a flange forming section. The lip forming section includes a die bar and a vertical die plate movable vertically toward and away from the die bar. The die bar and die plate have mating die surfaces which when brought together with a portion of the edge of the duct therebetween will form the portion of the duct into a lip. The flange forming section includes a male die member and a female die member lying in a horizontal plane. The female die member is movable horizontally toward and away from the male die member. The male and female die members have mating edges which when brought together with the end of the duct therebetween will form a grooved flange around the edge of the duct. An air cylinder is connected to the female die member to move it toward and away from the male die member. The means for moving the die plate of the lip forming section is connected to the female die member so that the movement of the female die member also moves the die plate.

13 Claims, 10 Drawing Figures

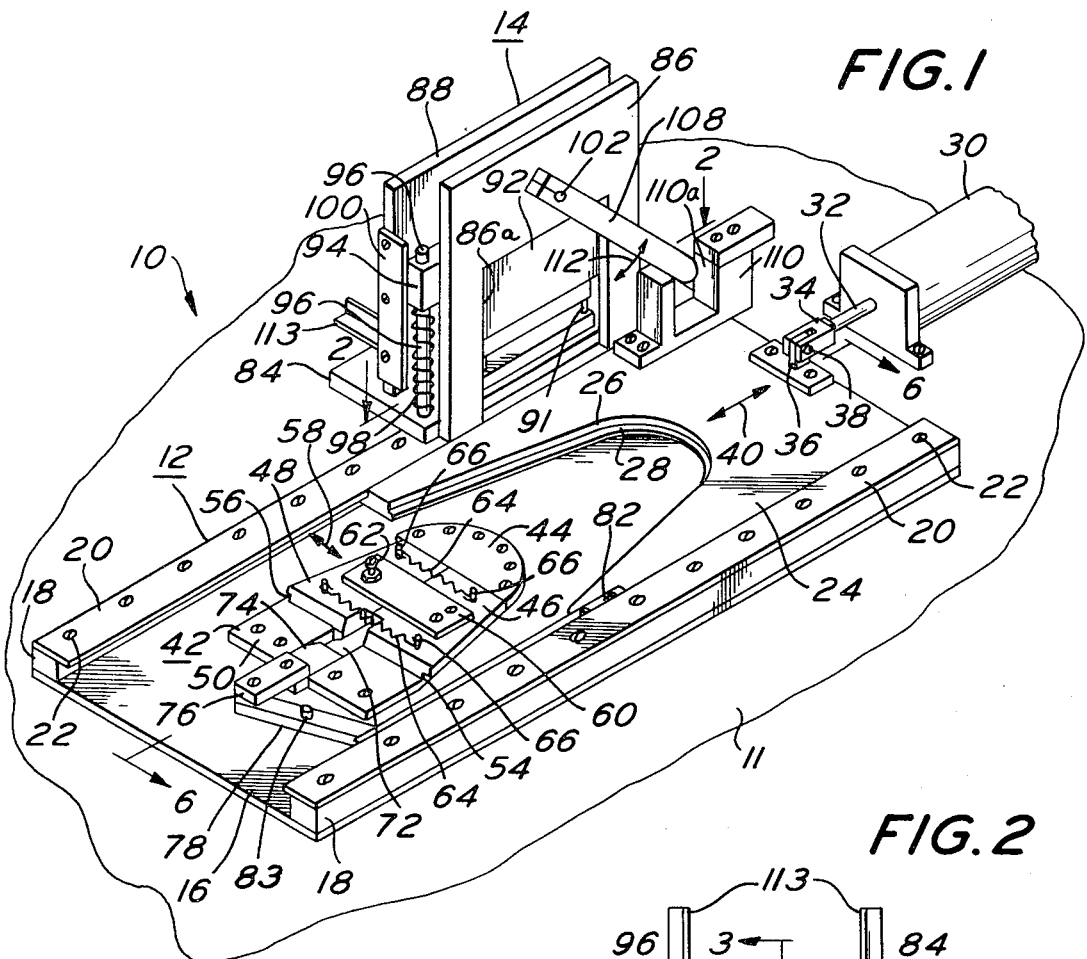
FIG. 1
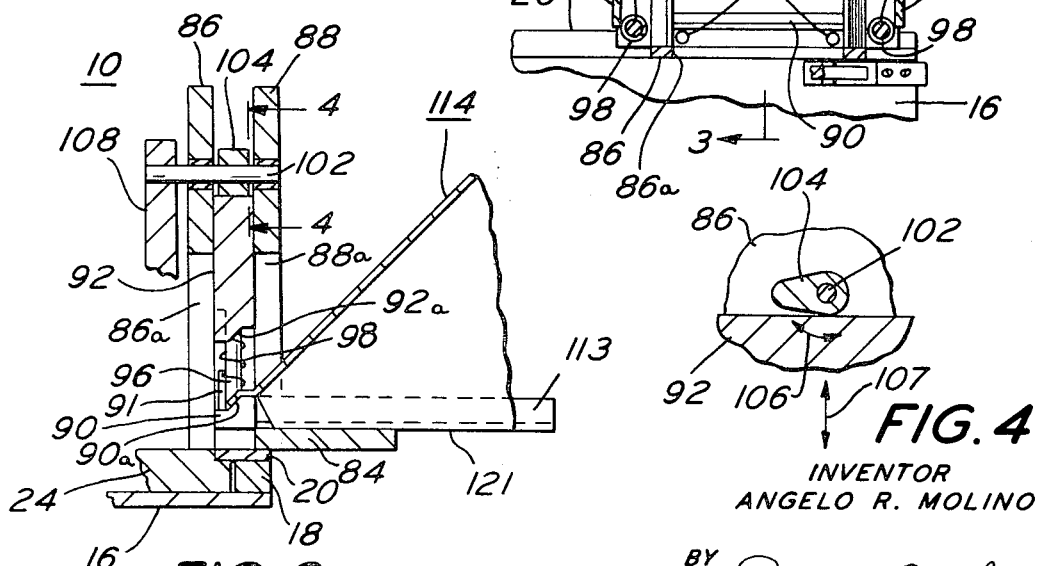
FIG. 2
FIG. 3
FIG. 4
INVENTOR
ANGELO R. MOLINO
BY
*Jacob Trachtman*
ATTORNEY

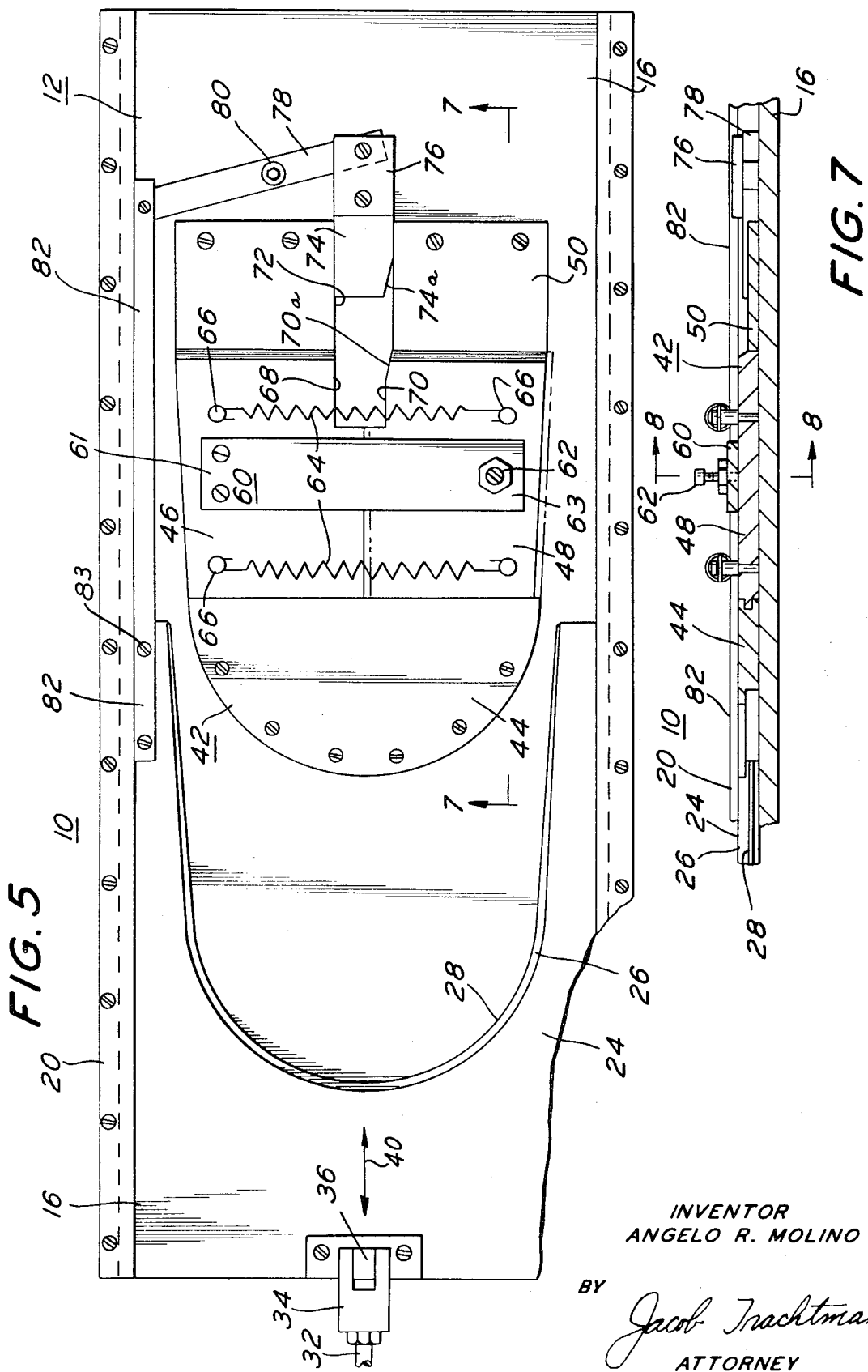

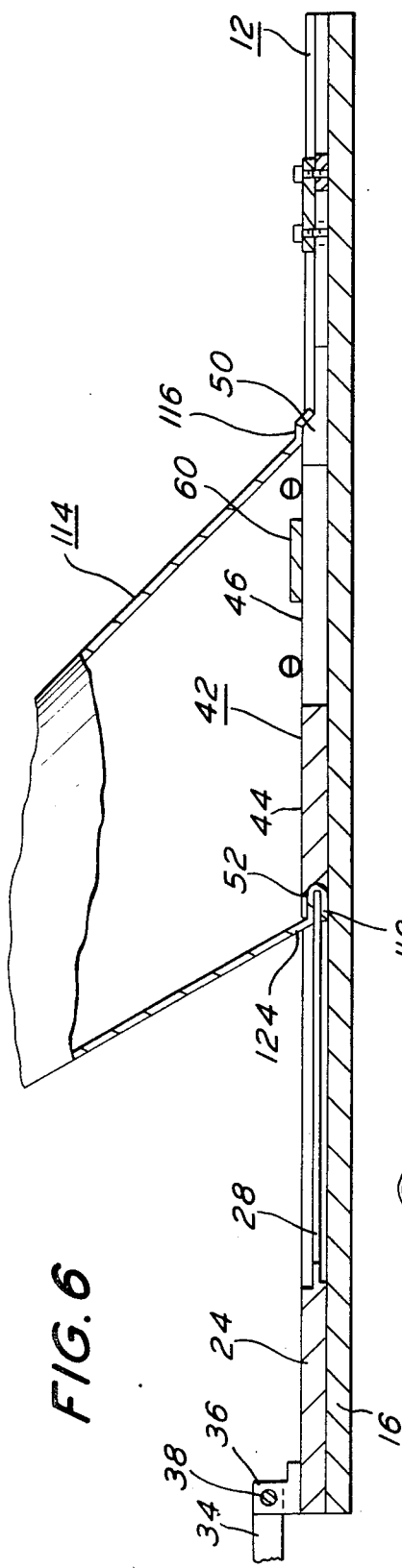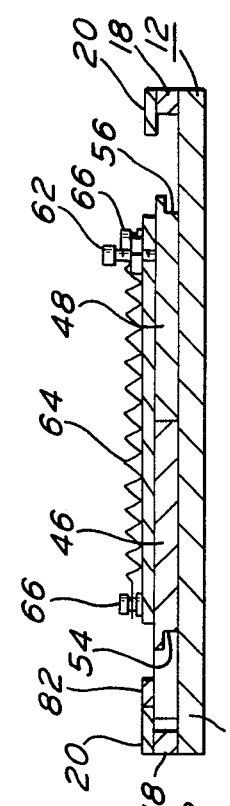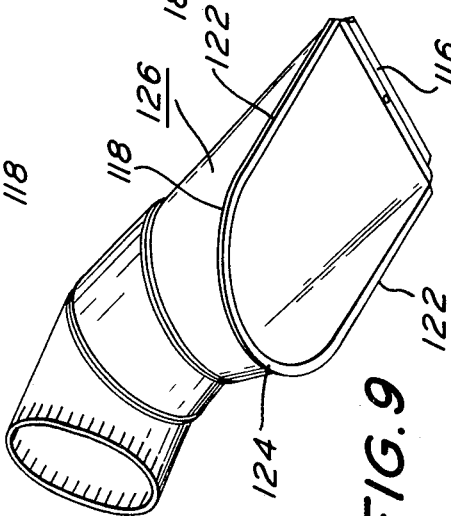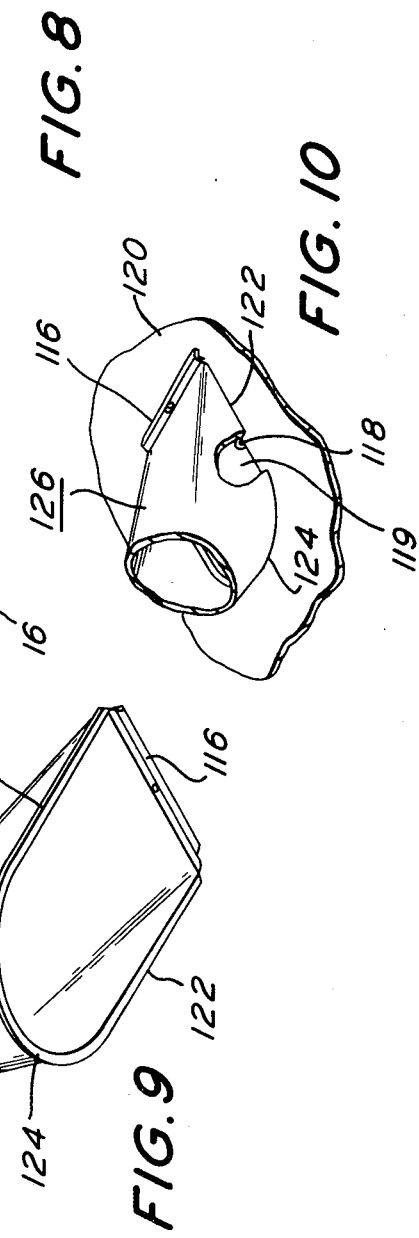

DUCT FORMING APPARATUS

The present invention relates to an apparatus for making a duct device, and more particularly to an apparatus for forming the mounting end of a duct device.

In my application for Letters Pat. Ser. No. 871,820, filed Oct. 28, 1969, entitled "Duct Structure," there is described a novel structure of a take-off duct which is capable of quick and easy connection in a system of duct work and which provides highly effective sealing action for efficient utilization under substantial pressure. The take-off duct is a generally tubular open-ended sheet metal member. One end of the take-off duct is provided with a flange extending partially thereabout with the flange being bent to provide a groove. A lip projects from along an edge of the one end of the duct. The end of the take-off duct fits in an opening in a side wall of a duct with the groove in the flange of the take-off duct receiving the edges of the opening in the duct, and the lip of the take-off duct extending along an edge of the opening in the duct in facing engagement with the side wall of the duct. To permit the take-off duct to be mounted in the side wall of the duct with the ease that it is designed for, the grooved flange must be properly formed to receive the edges of the opening in the side wall. To so form the take-off duct by hand is a time consuming and expensive operation. Therefore, it is desirable to have an apparatus which will properly form the end of the take-off duct quickly and easily so as to inexpensively form the take-off duct.

Therefore, it is an object of the present invention to provide an apparatus for forming the end of the take-off duct.

It is another object of the present invention to provide an apparatus for consistently and uniformly forming the end of the take-off duct.

It is still another object of the present invention to provide an apparatus which quickly and easily froms the end of the take-off duct.

Other objects of the present invention will become apparent upon reading the following specification and referring to the accompanying drawings, which form a material part of this disclosure.

These objects are achieved by an apparatus with means for bending an end edge of one end of a duct to form a lip along the edge. The apparatus also includes means for shaping the end of the duct to provide a curved edge portion between the side edges of the end of the duct and simultaneously forming a grooved flange along the side edges and the curved edge portion.

The invention accordingly consists in the features of construction, combinations of elements, and arrangements of parts, which will be exemplified in the structure hereinafter described, and of which the scope will be indicated by the appended claims.

In the drawings;

FIG. 1 is a perspective view of the apparatus of the present invention;

FIG. 2 is a sectional view taken along line 2—2 of FIG. 1;

FIG. 3 is a sectional view taken along line 3—3 of FIG. 2 during a forming operation;

FIG. 4 is a sectional view taken along line 4—4 of FIG. 3;

FIG. 5 is a top plane view of a portion of the apparatus;

FIG. 6 is a sectional view taken along line 6—6 of FIG. 1 during a forming operation;

FIG. 7 is a sectional view taken along line 7—7 of FIG. 5;

FIG. 8 is a sectional view taken along line 8—8 of FIG. 7;

FIG. 9 is a perspective view of the completed take-off duct; and

FIG. 10 is a perspective view showing the take-off duct mounted on the side wall of a duct.

Referring initially to FIG. 1 of the drawing, the duct forming apparatus of the present invention, which is generally designated as 10, includes a flange forming section, generally designated as 12, and a lip forming section, generally designated as 14.

The flange forming section 12 comprises a flat, rectangular base plate 16, (shown on a supporting surface 11) the sides of which are longer than the width of the ends. A pair of narrow rails 18—18 are mounted on the top surface of the base plate 16 and extend along the opposite side edges of the base plate. Flanges 20—20 are mounted on the rails 18—18 and project beyond the inner sides of the rails so as to overhang the base plate 16. The flanges 20—20 and rails 18—18 are secured to the base plate 16 by screws 22.

A flange forming female die member 24 is slidably mounted on the base plate 16. The female die member 24 is a flat plate of a size equal to the distance between the rails 18 so that the side edges of the die member extend under the flanges 20. The front end of the female die member 24 has a notch 26 therein. The notch 26 has straight side edges which are tapered toward each other from the front end of the die member, and a rounded back end edge. A rib 28 projects from the edge of the notch along the entire length of the edges of the notch. As shown in FIG. 6, the rib 28 is slightly below the center of the edges.

An air cylinder 30 is mounted on the supporting surface 11 adjacent the back end of the base plate 16 with its longitudinal axis being parallel to the side edges of the base plate. A piston rod 32 extends from the front end of the air cylinder 30 and has a yoke 34 on its front end. An upright tongue 36 is mounted on the top surface of the female die member 24 at the back edge thereof. The tongue 36 extends within the yoke 34 and is secured thereto by a hinge pin 38. Thus, the piston rod 32 is connected to the female die member 24 so that movement of the piston rod slides the female die member back and forth along the base plate 16 in the direction of the double headed arrow 40 in FIG. 1.

A flange forming male die member, generally designated as 42, is mounted on the base plate 16 between the rails 18 and facing the female die member 24. The male die member 42 is of a shape and size corresponding the shape and size of the notch 26 in the female die member 24. The male die member 42 includes a front section 44, a pair of side-by-side middle sections 46 and 48, and a back section 50. The front section 44 has a rounded edge corresponding to the rounded back end of the notch 26 of the female die member 24. The edge of the front section 44 has a groove 52 therein in alignment with the rib 28 on the edge of the notch 26.

The middle section 46 has a straight inner edge which extends along the longitudinal axis of the male die member, and an outer edge which extends from the edge of the front section 44 and is tapered to match the taper of a tapered side of the notch 26 of the female die member 24. The outer edge of the middle section 46 has a groove 54 therein which is in alignment with the rib 28 on the edge of the notch 26 (see FIG. 8). The middle section 48 has a straight inner edge and an outer edge which is tapered to match the taper of the other tapered side of the notch 26. However, the middle section 48 is slightly narrower than the middle section 46. Thus, when the inner edges of the middle sections are in contacting relation, the outer edge of the middle section 48 is spaced inwardly from the edge of the front section 44 as shown in FIG. 1. The outer edge of the middle section 48 has a groove 56 therein in alignment with the rib 28 on the edge of the notch 26 (see FIG. 8).

The middle section 46 is fixedly mounted on the base plate 16, whereas the middle section 48 is slidably mounted thereon for movement to and from the middle section 46 as indicated by the double headed arrow 58 in FIG. 1. A guide plate 60 extends across the top surfaces of the middle sections 46 and 48. The guide plate 60 is secured at one end 61 to the middle section 46. A guide pin 62 is threaded through the guide plate 60 adjacent its other end 63 and extends into an elongated key slot (not shown) in the middle section 48 so as to guide the middle section 48 and limit its movement. A pair of springs 64 extend across the top surfaces of the middle sections 46 and 48 and are connected at their ends to pins 66 projecting upwardly from the middle sections 46 and 48. The springs 64 are under tension so that they normally tend to pull the middle sections 46 and 48 together. The middle sections 46 and 48 have mating notches 68 and 70 respectively in their inner edges extending from their back edges. The notch 70 in the middle section 48 has a camming surface 70a at the back edge of the middle section 48.

The back section 50 is thinner than the middle sections 46 and 48, and has a recess 72 therethrough extending longitudinally from the back edge of the back section to the mating notches 68 and 70 in the middle sections. A camming member 74 is slidably seated in the recess 72 and has a camming surface 74a at its front end which is adapted to engage the camming surface 70a of the notch 70 of the middle section 48. A connecting member 76 is secured at one end to the back end of the camming member 74 and extends longitudinally from the camming member. The other end of the connecting member 76 is pivotally connected to a linkage rod 78. The linkage rod 78 is pivotally mounted on the base plate 16 by a pivot pin 80 which extends through the linkage rod between its ends. The other end of the linkage rod 78 is pivotally connected to an actuating rod 82. The actuating rod 82 is pivotally connected to the base plate 16 by a bolt 83. The actuating rod 82 extends along a rail 18 and is connected to the female die member 24. Thus, when the female die member 24 is moved toward the male die member 42, the linkage rod 78 is pivoted so as to move the camming member 74 toward the middle sections 46 and 48. When the camming surface 74a of the camming member 74 engages the camming surface 70a of the middle section 48, the middle section 48 is moved laterally away from the middle section 46 toward the female die member 24. When the female die member 24 is moved away from the male die member 42, the camming member 74 is moved away from the middle sections 46 and 48 and the springs 64 pull the middle section 48 back against the middle section 46.

The lip forming section 14 comprises a flat base 84 mounted at one edge on a rail flange 20 adjacent the back end of the base plate 16. The base 84 projects beyond the outer edge of the rail flange. An upright guide plate 86 is mounted on the rail flange 20 at the edge of the base 84. The guide plate 86 has an opening 86a therethrough extending from the bottom edge thereof so that the guide plate is substantially arch shaped. A second upright guide plate 88 is mounted on the base 84 and is spaced in parallel relation to the guide plate 86. The guide plate 88 has an opening 88a therethrough in alignment with the opening 86a in the guide plate 86 so that the guide plate 88 is also substantially arch shaped.

A die bar 90 is mounted on the base 84 between the guide plates 86 and 88 and extends across the openings 86a and 88a of the guide plates. As shown in FIG. 3, the die bar 90 has a step-shaped upper die surface 90a and has a pair of work material locating pins 91. A die plate 92 is slidably mounted between the guide plates 86 and 88. The die plate 92 has a step-shaped lower die surface 92a which is adapted to mate with the die surface 90a of the die bar 90. A pair of guide ears 94 project from the side edges of the die plate 92 adjacent the top edge of the die plate. Guide pins 96 are mounted in vertically upright position on the base 84 adjacent the side edges of the die plate 92. The guide pins 96 slidably extend through holes in the guide ears 94 of the die plate 92. Helical springs 98 extend around the guide pins 96 between the guide ears 94 and the base 84. The springs 98 normally tend to push the die plate 92 upwardly. Guide rails 100 are secured to and extend vertically along the side edges of the guide plate 88. The guide rails 100 extend across the ends of the guide ears 94 to help guide the vertical movement of the die plate 92.

A shaft 102 extends through and is rotatably supported on the guide plates 86 and 88 above the die plate 92. A cam wheel 104 is mounted on and secured to the shaft 102 between the guide plates 86 and 88. As shown in FIG. 4, the cam wheel 104 is substantially egg-shaped in cross-section with the shaft 102 extending through the wider portion. The cam wheel 104 is positioned to engage the top edge of the die plate 92, and upon rotation of the shaft 102, as indicated by the double headed arrow 106 in FIG. 4, will move the die plate vertically, as shown by the double headed arrow 107, between the guide plates 86 and 88. The shaft 102 projects beyond the guide plate 86, and an actuating arm 108 is mounted at one end of the shaft 102. The arm 108 extends from the shaft 102 downwardly and toward the back edge of the base plate 16. An actuating block 110 is mounted on the female die member 24 at the back edge thereof. The block 110 has a notch 110a in its upper surface, and the lower end of the actuating arm 108 extends into the notch 110a. A pair of L-shaped support rails 113 are mounted on the base 84 at opposite ends of the die bar 90, and extend in spaced parallel relation from the die bar as shown in FIG. 2.

When the female die member 24 is moved toward and away from the male die member 42, as indicated by the double headed arrow 40 in FIG. 1, the block 110 acts to pivot the actuating arm 108 as indicated by the double headed arrow 112 in FIG. 1. This rotates the shaft 102 which rotates the cam wheel 104 as indicated by the double headed arrow 106 in FIG. 4. The rotation of the cam wheel 104 causes the cam wheel to engage the top surface of the die plate 92 so that the die plate is moved toward and away from the die bar 90. The cam wheel 104 act to move the die plate 92 toward the die bar 90, and the springs 98 act to move the die plate away from the die bar upon the reciprocation of the cam wheel.

To form a take-off duct 114 with the apparatus 10 of the present invention, one starts with a tabular, sheet metal duct having the end to be formed cut on a bias, i.e., cut along a plane which is not perpendicular to the longitudinal axis of the duct. The duct also has a pair of longitudinal cuts providing the longer sides 121 (see FIG. 3) for forming the sides 122 (see FIG. 9) extending from the rounded end 124 to be formed. The cuts are spaced apart a distance equal to the width of the lip 116 to be formed. The first operation is to form the lip 116 of the duct. This is achieved by placing the bias-cut end of the preformed duct 114 on the support rails 113 with the portion of the duct end between the longitudinal cuts being over the die bar 90 and in abutment with the locating pins 91 as shown in FIG. 3. The air cylinder 30 is actuated to move the female die member 24 toward the male die member 42. This causes the actuating arm 108 to be pivoted. As previously described, pivoting the actuating arm 108 rotates the cam wheel 104 so as to move the die plate 92 downwardly against the die bar 90. As shown in FIG. 3, when the die surfaces of the die plate 92 and die bar 90 come together, they engage the edge of the duct 114 and form the step-shaped lip 116. When the air cylinder 30 is actuated to move the female die member 24 away from the male die member 42, the actuating arm 108 is pivoted back and the springs 98 move the die plate 92 upwardly away from the die bar 90. The duct 114 with the formed lip 116 is then removed from the lip forming section 14.

The end of the duct 114 is then placed over the male die member 42 with the lip 116 being seated on and extending along the back edges of the middle sections 46 and 48 as shown in FIG. 6, and the rounded portion 124 of the duct extending around the front section 44. The air cylinder 30 is actuated again to move the female die member 24 toward the male die member 42. This movement of the female die member 24 moves the actuating rod 82 which pivots the linkage rod 78. The linkage rod 78 moves the camming member 74 toward the middle sections 46 and 48 of the male die member 42. The camming member 74 is thus moved into engagement with the middle section 48 so as to move the middle section 48 away from the middle section 46 toward the female die member 24 which has moved to a position around the male die member 42. As the female die member 24 comes into mating relation with the male die member 42, the rib 28 around the edge of the notch 26 in the female die member presses the edge of the duct 114 into the groove 52 in the front section and the grooves 54 and 56 in the middle sections 46 and 48 respectively of the male die member 42.

Thus, as shown in FIG. 6, the edge of the duct member 114 is formed with a grooved flange 118 around the edge thereof. At the same time the mating of the male and female die members shape the end 124 of the duct 114 to correspond with the shape of the notch 26 in the female die member 24. Thus the end of the duct 114 is simultaneously shaped to the desired shape, and provided with a grooved flange 118 around its edge.

The female die member 24 is then moved away from the male die member 42. This pivots the linkage rod 78 so as to move the camming member 74 away from the middle sections 46 and 48 of the male die member 42. The springs 64 then pull the middle section 48 back against the middle section 46 and away from the edge of the duct 114. This releases a portion of the grooved flange 118 of the duct 114 from the male die member 42 so that the duct can then be lifted and removed from the male die member. The end of the fully formed duct 126 is then of the shape shown in FIG. 9 with a grooved flange 118 extending along a pair of spaced sides 122 and a rounded side 124 thereof, and a lip 116 projecting from the remaining side thereof. The duct 126 can then be mounted in an opening 119 in a wall of another duct 120 as shown in FIG. 10 and as described in my co-pending application Ser. No. 871,820.

From the foregoing, it can be seen that the apparatus 10 of the present invention can easily and quickly form the end of a take-off duct with each duct formed being of uniform shape. Thus, it is assured that each duct formed can be easily mounted in an opening in a main duct.

Although the present invention has been described in some detail by way of illustration and example for purposes of clarity of understanding, it is understood that certain changes and modifications may be made within the spirit of the invention and scope of the appended claims.

What is claimed is:

1. Apparatus for forming a grooved flange at the end of a duct including a base plate, die means having a male die member mounted on said base plate and a female die member slidably mounted on said base plate for movement toward and away from said male die member, said male and female die members having mating edges which are adapted to form the grooved flange on the end of the duct, the female die member is a flat plate having a notch in its front edge and the male die member is shaped to fit into said notch so that the outer edge of the male die member and the edge of the notch in the female die member are the mating edges which form the grooved flange on the end of the duct, the edge of the notch in the female die member has a rib which projects therefrom and the male die member has a groove in its outer edge which is adapted to receive the rib to form the grooved flange on the end of the duct, the notch in the female die member has straight sides which taper toward each other from the front edge of the female die member and a rounded end edge extending between said side edges, and the rib extends from along the entire length of the side and end edges, the male die member has a front section, a pair of side-by-side middle sections and a back section, the front section has a rounded edge which corresponds in shape to the rounded end edge of the notch in the female die member, and the middle sections have tapered outer edges which correspond to the tapered side edges of the notch in the female die member, one of the middle sections is fixedly mounted on the base plate with its tapered outer edge extending from the edge of the front section and the other middle section is slidably mounted on the base plate for movement between a first position in which its tapered outer edge is spaced inwardly from the edge of the front section and a second position in which its tapered outer edge extends from the edge of the front section.

2. Apparatus in accordance with claim 1 including means for moving said other middle section from its first position to its second position when the female die member is moved into mating relation with the male die member, and means for moving said other middle section back to its first position when the female die member is moved away from the male die member.

3. Apparatus in accordance with claim 2 which the means for moving said other middle section between its first and second positions includes a camming member and means for moving said camming member into and out of engagement with said other middle section when the female die member is moved into and out of mating relation with the male die member.

4. Apparatus in accordance with claim 3 in which the means for moving the other middle section back to its first position includes spring means connected between said middle sections and placed under tension when the other middle section is moved from its first position to its second position.

5. Apparatus in accordance with claim 4 in which the back section is thinner than the middle sections and has a recess therethrough extending longitudinally from its back edge to the middle sections, and the camming member is slidably mounted in said recess.

6. Apparatus in accordance with claim 5 in which the means for moving said camming member includes a linkage rod pivotally mounted between its ends on the base plate adjacent the back section of the male die member, one end of the linkage rod is connected to the camming member and the other end is connected to the female die member.

7. Apparatus in accordance with claim 6 in which the base plate is rectangular, a pair of rails are mounted on the base plate and extend along opposite side edges of the base plate, a separate flange is secured to and extends along each of the rails, each of said flanges projects beyond the respective rail and overhangs the base plate, the male die member is mounted on the base plate between the rails, and the female die member extends under each of said rail flanges so as to be slidably supported on the base plate.

8. Apparatus for forming a grooved flange at the end of a duct including a base plate, die means having a male die member mounted on said base plate and a female die member slidably mounted on said base plate for movement toward and away from said male die member, said male and female die members having mating edges which are adapted to form the grooved flange on the end of the duct, second die means for forming a portion of the end of the duct into a lip proximate to the grooved flange formed around the remaining portion of the end of the duct, the second die means including a die bar mounted on said base plate along an edge thereof, and a die plate supported on said base plate for vertical movement toward and away from the die bar, said die bar and die plate having mating surfaces which are adapted to form the lip on the end of the duct, and a pair of guide plates mounted in spaced parallel vertically upright position on the base plate along an edge thereof, said guide plates having aligned openings therethrough at the bottom edges thereof, the die bar being mounted between said guide plates and extending across the openings, and the die plate being slidably supported between said guide plates.

9. Apparatus in accordance with claim 8 in which the die plate has a separate guide ear projecting from each side edge thereof, guide pins are mounted in vertically upright position along the side edges of the die plate and slidably extend through openings in the guide ears, and a separate helical spring surrounds each of the guide pins and supports the die plate thereon.

10. Apparatus in accordance with claim 9 including cam means engagable with said die plate to move said die plate into mating relation with said die bar.

11. Apparatus in accordance with claim 10 in which said cam means includes a shaft extending through and rotatably supported on said guide plates above the die plate and a cam wheel on said shaft between said guide plates, said cam wheel engaging said die plate upon rotation of the shaft to move the die plate into mating relation with the die bar.

12. Apparatus in accordance with claim 11 including an actuating arm secured at one end to the shaft and extending radially from the shaft toward the female die member of the second die means, and means on said female die member engaging said actuating arm so that movement of the female die member toward and away from the male die member rotates the shaft to move the die plate toward and away from the die bar.

13. Apparatus in accordance with claim 12 including pneumatic motive means providing reciprocating movement for concurrently actuating said first and second die means.

* * * * *